April 11, 1967  R. A. FERRARA  3,313,571
REMOVABLE AND STACKABLE SEATING ARRANGEMENT
Filed Oct. 11, 1965  2 Sheets-Sheet 1

INVENTOR.
Rudolph A. Ferrara
BY
Robert L. Spencer
ATTORNEY

April 11, 1967      R. A. FERRARA      3,313,571

REMOVABLE AND STACKABLE SEATING ARRANGEMENT

Filed Oct. 11, 1965      2 Sheets-Sheet 2

INVENTOR.
Rudolph A. Ferrara
BY
Robert L. Spencer
ATTORNEY

United States Patent Office 3,313,571
Patented Apr. 11, 1967

3,313,571
REMOVABLE AND STACKABLE SEATING ARRANGEMENT
Rudolph A. Ferrara, Warren, Mich., assignor to General Motors Corporation, Detroit, Mich., a corporation of Delaware
Filed Oct. 11, 1965, Ser. No. 494,465
5 Claims. (Cl. 297—239)

This invention relates to a vehicle seating arrangement and more particularly to a vehicle having individual front seats for the driver and passenger with one of the seats being removable for storing to provide more load carrying space in the vehicle.

With the increased use of small vehicles for short business driving, such as trips to the shopping center or other short trips about town, it is often desirable to have increased load carrying capacity on some occasions and passenger carrying ability on other occasions.

It is an object of this invention to provide a pair of compatible seats for a vehicle in which the passenger carrying seat may be removed from its mounting and placed over the driver's seat for easy storage and to provide increased load carrying capacity for the vehicle.

Another potential use for this type of seat is in commercial or other vehicles which are operated under conditions which make it desirable to have passenger seats in position only part of the time; for instance, in a small delivery truck in which a helper is required only part of the time. When no helper is required, the front passenger seat could be removed and placed over the driver's seat to increase the load carrying capacity of the vehicle.

Another object of this invention is to provide a pair of seats for a vehicle in which one of said seats is stackable on the other seat by removing it from its mounting and placing it in a stacked position on top of the other seat, thereby increasing the height of the driver's seat only a small amount and providing more usable space in the vehicle.

Increased use of plastics for seating structures lends itself to the seat structure of this design. The back of the passenger's seat is cast to be compatible with the front of the driver's seat so that in stacked relation they mate.

Another object of this invention is to provide plastic shell type seats for the driver and passenger of a vehicle in which the rear contour of the passenger's seat is compatible with the occupant's or front side of the driver's seat so that, when the passenger's seat is stored upon the driver's seat, the mating surfaces will be compatible.

These and other objects will become apparent as reference is had to the accompanying specification and drawings wherein.

Figure 1:
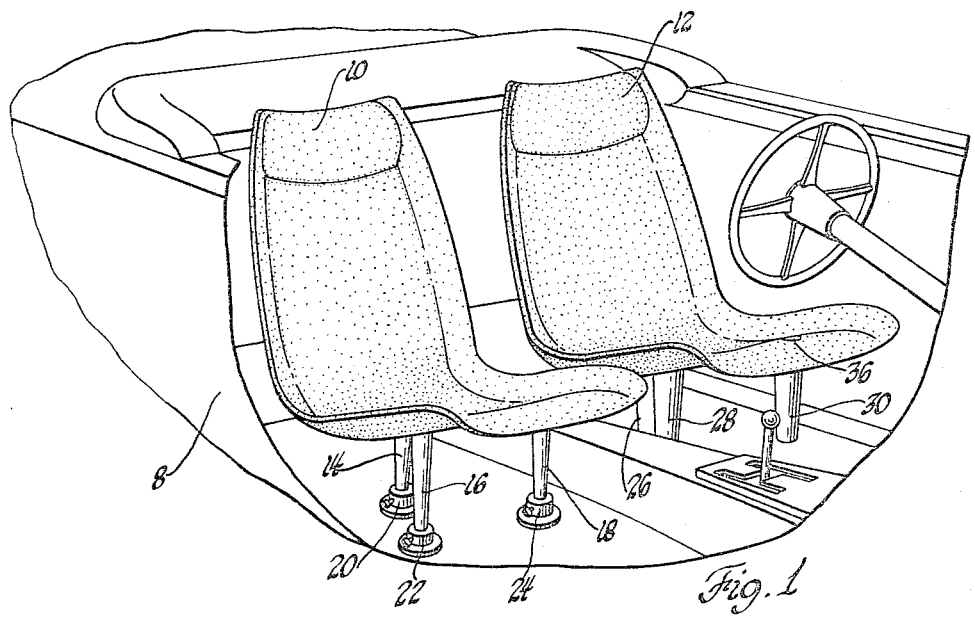
FIGURE 1 is a view of the front seating arrangement of a vehicle, with sections cut away, having individual passenger's and driver's seating units in accordance with this invention.

Referring now to the drawing, as best seen in FIGURE 1, in a vehicle body 8 a pair of bucket seats 10, 12 are mounted in the front seating area for a passenger and driver, respectively. The seats are provided with tripod type legs in the embodiment shown, but if four or more legs are preferred they would be equally acceptable for use in this invention. The driver's seat 10 has three tapered legs 14, 16 and 18 that are secured to the shell of the seat 10 for supporting it on the floor of the vehicle body 8. Three latches 20, 22 and 24, of conventional design, are secured to the floor of the vehicle body 8 for securing the legs 14, 16 and 18, respectively, to the vehicle body for retaining the passenger seat 10 in the seating position.

Figure 2:
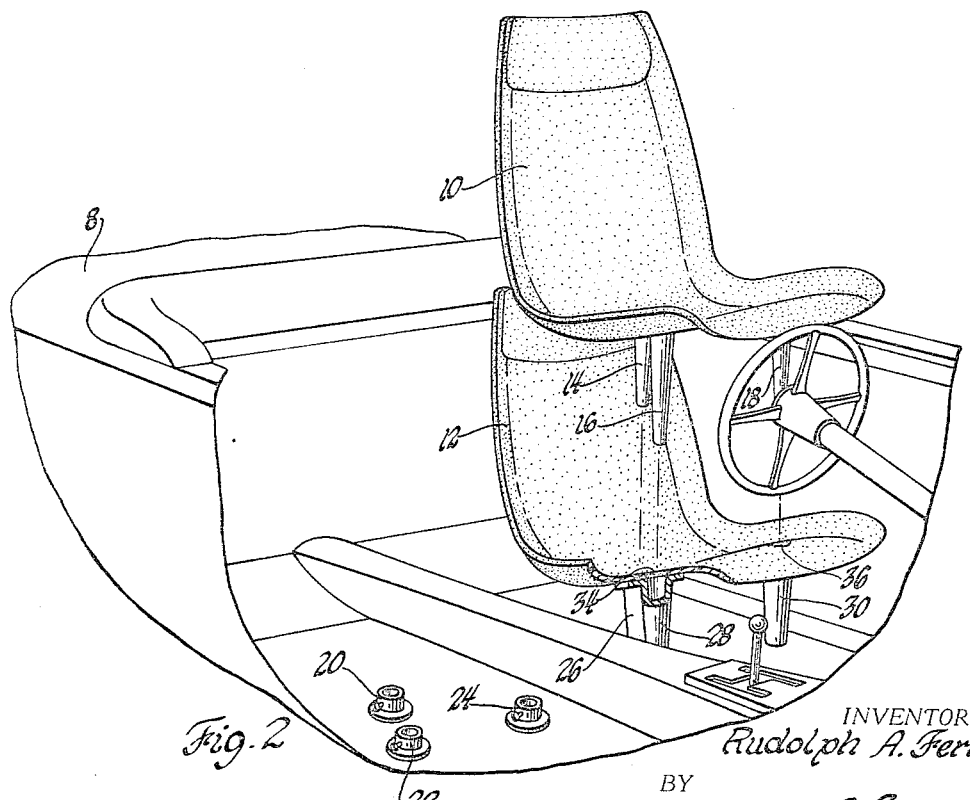
FIGURE 2 is a view of a front seating compartment of a vehicle, with sections cut away, in which the passenger's seating unit has been removed from its mounting and is positioned above the driver's seat prior to being placed in its stored position.
Figure 3:
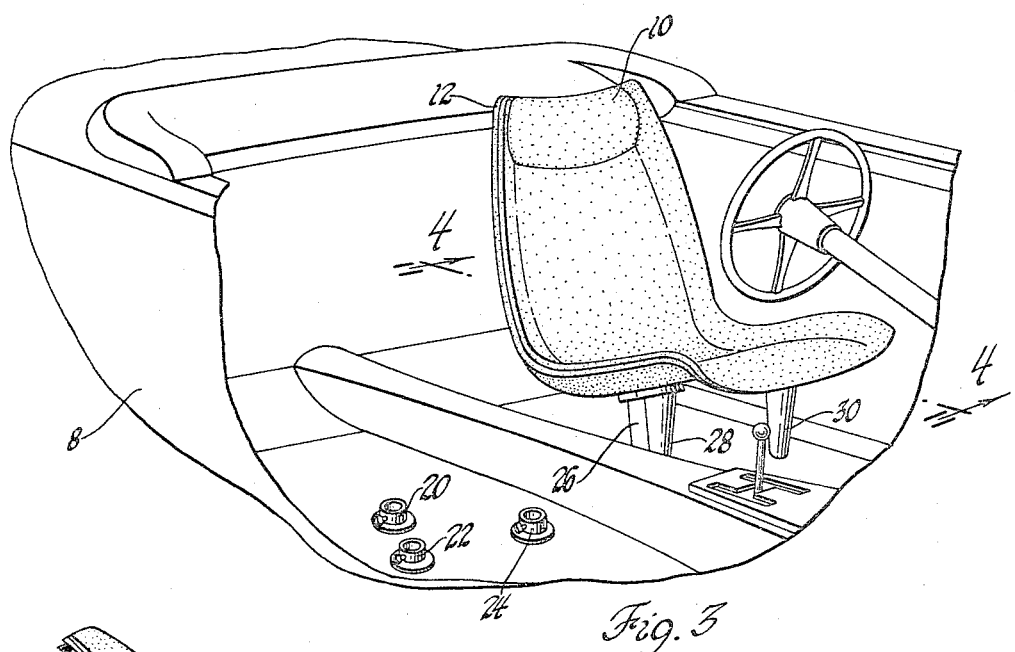
FIGURE 3 is a view of the front seating arrangement of a vehicle in which the passenger's seat has been removed from its mounting and is positioned over the driver's seat in the stored position.
Figure 4:
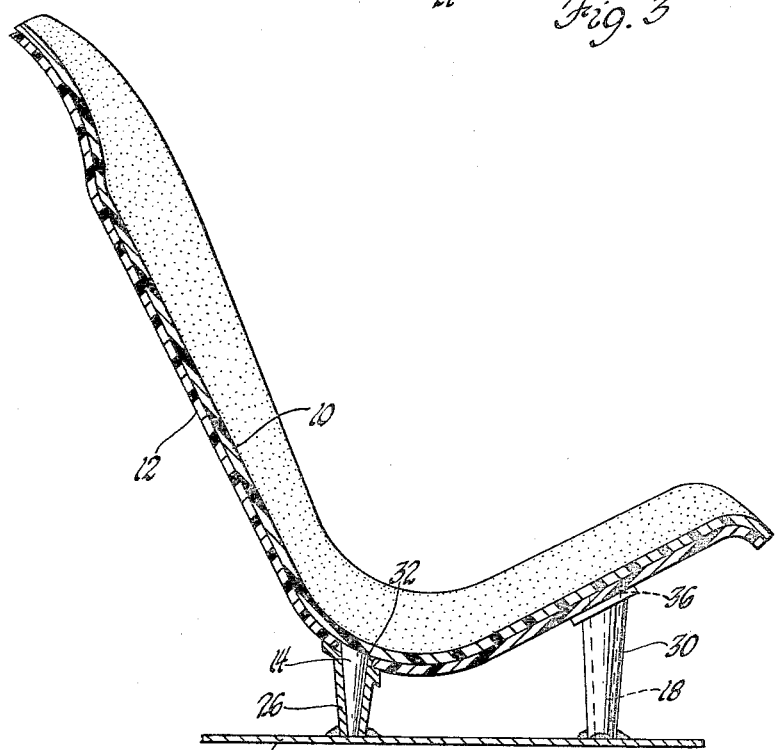
FIGURE 4 is a view substantially along the line 4—4 of FIGURE 3 showing how the contour of the front of the driver's seat mates with the back contour of the passenger's seat in the stored position.

The driver's seat 12 is provided with three hollowed tapered legs 26, 28 and 30 that have one end secured to the floor of a vehicle body 8 and the other end is secured to the shell of the seat 12. As best seen in FIGURES 2 and 4, apertures 32, 34 and 36 are formed in the shell 12 to be coextensive with the hollow interior of the legs 26, 28 and 30, respectively. The seats 10 and 12 are preferably formed of a plastic shell which readily lends itself to modern molding techniques providing high strength and rigid dimensional control. Other methods of fabricating the seat shell may be employed, such as dieformed sheet metal or cast metal shells. In forming the seat shells, the passenger shell 10 has the back or rear surface formed to mate with the front or supporting surface of the driver's seat. The apertures 32, 34 and 36 in the driver's seat and the hollow legs 26, 28 and 30, respectively, are positioned to receive the tapered legs 14, 16 and 18 of the passenger's seat 10 when it is placed in the storage position shown in FIGURES 3 and 4.

In operation, the seats are normally positioned in the vehicle, as shown in FIGURE 1, for supporting the driver and the passenger in the vehicle. If additional load space is required the latches 20, 22 and 24 are released freeing the legs 14, 16 and 18 for movement of the seat 10. The seat 10 may then be positioned above the driver's seat 12, as shown in FIGURE 2, then the legs 14, 16 and 18 are inserted in the respective hollow legs 26, 28 and 30 of the driver's seat through the apertures 32, 34 and 36, respectively. In the stored position, as seen in FIGURE 3 and FIGURE 4, the back of the passenger's seat 10 mates with the front of the driver's seat 12 so that the driver may occupy the combined seats in a normal operating position. Thus, the space where the passenger's seat was formerly positioned is free to be used as additional space for a load carrying purpose.

If it is desired to use upholstering material on the seat shell, up to approximately one-half inch of padding could be applied to the seats without affecting the storaging of the passenger seat as shown in FIGURES 3 and 4. However, if more than approximately one-half inch of padding is desired or required, the padding on the driver's seat could be made removable for aid in storing the passenger's seat thereon.

While but one embodiment of this invention is shown and explained, it is not intended to limit this invention in any way other than by the limits of the following claims.

I claim:
1. In combination in a motor vehicle body, a seating arrangement having an individual driver's seat and an individual passenger's seat, one of said seats being permanently secured to said body in seat forming position, the other of said seats being releasably secured to said body in seat forming position and being movable therefrom, said permanently secured seat including a plurality of hollow legs, each of said hollow legs having one end secured to said body and the other end secured to said permanently secured seat for supporting said permanently secured seat in said body, a plurality of apertures in said permanently secured seat, each of said apertures being coextensive with the inner diameter of one of said hollow legs, said movable seat having the same number of legs as said permanently secured seat, said legs of the movable seat having one end secured to said movable seat and the other end releasably secured to said body, the outer diameter of said movable seat legs being smaller than the inner diameter of said hollow legs, said permanently secured seat having the contour of the supporting surface compatible with the contour of the back surface of said movable seat for storing said movable seat over said permanently secured seat with said legs thereof extending into said hollow legs of said permanently secured seat.

2. In combination in a motor vehicle body, a seating arrangement having an individual driver's seat and an individual passenger's seat, said driver's seat being permanently secured to said body in seat forming position, said passenger's seat being releasably secured to said body in seat forming position and being movable therefrom, said driver's seat including three hollow legs, each of said hollow legs having one end secured to said body and the other end secured to said driver's seat for supporting said driver's seat in said body, three apertures in said driver's seat, each of said apertures being coextensive with one of the inner diameters of said hollow legs, said passenger's seat including three legs having the outer diameter of said passenger's seat legs being smaller than the inner diameter of said hollow legs, said driver's seat having the contour of the supporting surface compatible with the contour of the back surface of said passenger's seat for storing said passenger's seat on said driver's seat with said legs of said passenger's seat extending into said hollow legs of said driver's seat whereby the compatible surfaces of said seats are in contact.

3. In combination in a motor vehicle body, a seating arrangement having an individual driver's seat and an individual passenger's seat, said driver's seat being permanently secured to said body in seat forming position, said passenger's seat being releasably secured to said body in seat forming position and being movable therefrom, said driver's seat including at least one hollow leg having one end thereof secured to said body and the other end secured to said driver's seat for supporting said driver's seat in said body, said passenger's seat including a number of legs corresponding to the number of legs on the driver's seat and having the outer diameter of each smaller than the inner diameter of the complementary hollow leg of the driver's seat, said driver's seat having the contour of the supporting surface compatible with the contour of the back surface of said passenger's seat for storing said passenger's seat on said driver's seat so that each leg of said passenger's seat extends into a complementary hollow leg of said driver's seat whereby the compatible surfaces of said seats are in contact.

4. In combination in a motor vehicle body, a seating arrangement having an individual driver's seat and an individual passenger's seat, said driver's seat being secured to said body in seat forming position, said passenger's seat being releasably secured to said body in seat forming position and being movable therefrom, said driver's seat including a plurality of hollow legs each having one end secured to said body and the other end secured to said driver's seat for supporting said driver's seat in said body, said passenger's seat including a number of legs corresponding to the number of legs on the driver's seat and having the outer diameter of each smaller than the inner diameter of said hollow leg of the driver's seat, said driver's seat having the contour of the supporting surface compatible with the contour of the back surface of said passenger's seat for storing said passenger's seat on said driver's seat with said legs of said passenger's seat extending into said hollow legs of said driver's seat whereby the compatible surfaces of said seats are in contact.

6. In combination in a motor vehicle body, a seating arrangement having an individual driver's seat and an individual passenger's seat, one of said seats being supported by said body in seat forming position, the other of said seats being releasably mounted to said body in seat forming position and being movable therefrom, said one of said seats including a plurality of hollow legs, each of said hollow legs having one end supported by said body and the other end secured to said one of said seats, a plurality of apertures in said one of said seats, each of said apertures being coextensive with the inner diameter of one of said hollow legs, the other of said seats having the same number of legs as said one of said seats with one end of each leg secured thereto and the other end of each leg releasably secured to said body, the outer diameter of said last-mentioned legs being smaller than the inner diameter of said hollow legs, said one of said seats having the contour of its supporting surface compatible with the contour of the back surface of said other of said seats for storing the latter with said legs thereof extending into said hollow legs.

References Cited by the Examiner

UNITED STATES PATENTS

| 745,108 | 11/1903 | Kashian | 296—65 |
|---|---|---|---|
| 972,046 | 10/1910 | Winton et al. | 296—64 |
| 1,459,159 | 6/1923 | Maise | 296—64 |
| 1,465,729 | 8/1923 | Emond | 296—64 |
| 2,589,922 | 3/1952 | Bowman | 296—65 |
| 2,605,064 | 7/1952 | Davis | 248—361 |
| 2,812,800 | 11/1957 | Eames | 297—239 |
| 2,967,565 | 1/1961 | Schultz | 297—239 |

FOREIGN PATENTS

| 1,145,841 | 5/1957 | France. |
|---|---|---|
| 1,161,951 | 3/1958 | France. |
| 335,614 | 4/1921 | Germany. |

FRANK B. SHERRY, *Primary Examiner.*

FRANCIS K. ZUGEL, *Examiner.*